US009521298B2

(12) United States Patent
Hughes

(10) Patent No.: US 9,521,298 B2
(45) Date of Patent: Dec. 13, 2016

(54) COLOR MANAGEMENT SYSTEM

(75) Inventor: Richard Hughes, London (GB)

(73) Assignee: Red Hat, Inc., Raleigh, NC (US)

( * ) Notice: Subject to any disclaimer, the term of this patent is extended or adjusted under 35 U.S.C. 154(b) by 648 days.

(21) Appl. No.: 12/835,634

(22) Filed: Jul. 13, 2010

(65) Prior Publication Data

US 2012/0013631 A1  Jan. 19, 2012

(51) Int. Cl.
*G09G 5/02* (2006.01)
*H04N 1/60* (2006.01)

(52) U.S. Cl.
CPC ..................... *H04N 1/603* (2013.01)

(58) Field of Classification Search
None
See application file for complete search history.

(56) References Cited

U.S. PATENT DOCUMENTS

| | | | | |
|---|---|---|---|---|
| 6,525,721 | B1* | 2/2003 | Thomas | G06F 3/0481 345/594 |
| 6,937,249 | B2* | 8/2005 | Herbert et al. | 345/581 |
| 6,947,589 | B2* | 9/2005 | Newman et al. | 382/162 |
| 7,184,057 | B2* | 2/2007 | Stokes et al. | 345/600 |
| 8,014,027 | B1* | 9/2011 | Kulkarni et al. | 358/1.9 |
| 8,073,248 | B2* | 12/2011 | Brunner et al. | 382/165 |
| 2003/0117639 | A1* | 6/2003 | Milton | G06K 15/02 358/1.13 |
| 2005/0110798 | A1* | 5/2005 | Zeng et al. | 345/600 |
| 2006/0262360 | A1* | 11/2006 | Dalrymple | H04N 1/6033 358/504 |
| 2007/0216776 | A1* | 9/2007 | Woolfe | 348/222.1 |
| 2008/0244412 | A1* | 10/2008 | Stokes | 715/734 |
| 2009/0207998 | A1* | 8/2009 | Wall | G11B 27/322 380/29 |

OTHER PUBLICATIONS

[Online], [retrieved Nov. 2, 2012], "DIG Specification", URL: http://www.bgbm.org/tdwg/acc/Documents/DIG35-v1.1WD-010416.pdf.*
[Online], [retrieved Nov. 3, 2012], "GNU Image Manipulation Program User Manual", URL: http://www.divshare.com/download/3193017e, pp. 44, 355, 356.*
"Color Space and Color Profiles | dpBestflow", [online], [retrieved Jul. 15, 2015], Jan. 2010.*
"GnomeColorManager—GNOME Live!", accessed at: http://live.gnome.org/GnomeColorManager on Jul. 1, 2010, last updated Jun. 4, 2010, 17 pages.

(Continued)

*Primary Examiner* — Ulka Chauhan
*Assistant Examiner* — Patrick F Valdez
(74) *Attorney, Agent, or Firm* — Lowenstein Sandler LLP

(57) ABSTRACT

Management of color of image files in digital devices is described. A color management system can extract metadata from an image file based on a type of the image file. The color management system then creates a color profile based on the metadata extracted. The color management system further creates a virtual device, and assigns the color profile created to the virtual device. As such, multiple color profiles can be associated with a single physical device using the concept of virtual devices. Furthermore, the extraction of metadata and generation of color profiles can also be centralized in the color management system, which may be integrated into an operating system executable on a computing device.

24 Claims, 4 Drawing Sheets

(56) References Cited

OTHER PUBLICATIONS

Technical Blog of Richard Hughes, "GNOME Color Manager release next Monday", accessed at: http://blogs.gnome.org/hughsie/2009/12/02/gnome-color-manager-release-next-monday/ on Jul. 1, 2010, last updated Dec. 2, 2009, 3 pages.
GNOME Color Manager, "Home", accessed at: http://projects.gnome.org/gnome-color-manager/ on Jun. 25, 2010, 1 page.
GNOME Color Manager, "Screenshots", accessed at: http://projects.gnome.org/gnome-color-manager/screenshots.html on Jul. 1, 2010, 3 pages.
"Color management", accessed at: http://en.wikipedia.org/wiki/Color_management_system on Jul. 2, 2010, last updated Jun. 22, 2010, 6 pages.
"ICC profile", accessed at: http://en.wikipedia.org/wiki/ICC_profile on Jul. 2, 2010, last updated Jun. 7, 2010, 3 pages.
"Microsoft Professional Photography: Better color management for Windows XP", accessed at: http://www.microsoft.com/prophoto/downloads/colorcontrol.aspx on Jul. 9, 2010, 2 pages.
"Microsoft Professional Photography: Microsoft Pro Photo Tools 2", accessed at: http://www.microsoft.com/prophoto/downloads/tools.aspx on Jul. 9, 2010, 2 pages.

\* cited by examiner

COLOR MANAGEMENT SYSTEM

TECHNICAL FIELD

Embodiments of the present invention relate to image files in digital devices, and more specifically to managing colors of image files.

BACKGROUND

Conventionally, when generating images or photographs on a digital camera or other input device (e.g., a scanner), the images are usually generated without an embedded device color profile. An international standard, International Color Consortium (ICC), for color profiles has been developed to define how a device responds to a color. For example, these profiles can be used to correct printers that print too "bluish" or cameras that creates too much contrast between colors of objects. One can download common ICC profiles from digital camera or input device manufacturer websites, or generate them using calibration equipment. ICC profiles are normally files separate from the image files, but can be "embedded" in the image files for remote applications to read. Embedding the profile is only common when working with professional printers or artists, as each profile adds significant size to each image file, and vendors typically want the input device to store as many images on the storage media (e.g., flash card) as possible. Typically, users interact with profiles by manually assigning each image with a profile when it is viewed or edited on computers, although very few applications do this. Because of the great difficulty in the use of ICC, hardly anybody (especially for amateurs or laymen) does this in practice today.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of a method, an apparatus, and a system to manage color of image files in computing devices. In some embodiments, a color management system executable on a computing device can extract metadata from an image file based on a type of the image file. The color management system then creates a color profile based on the metadata extracted. The color management system further creates a virtual device, and assigns the color profile created to the virtual device. As such, multiple color profiles can be associated with a single physical device using the concept of virtual devices. Furthermore, the extraction of metadata and generation of color profiles can also be centralized in the color management system, which may be integrated into an operating system of the computing device. Details of some embodiments of how to manage color of image files in computing devices are described below.

Figure 1:
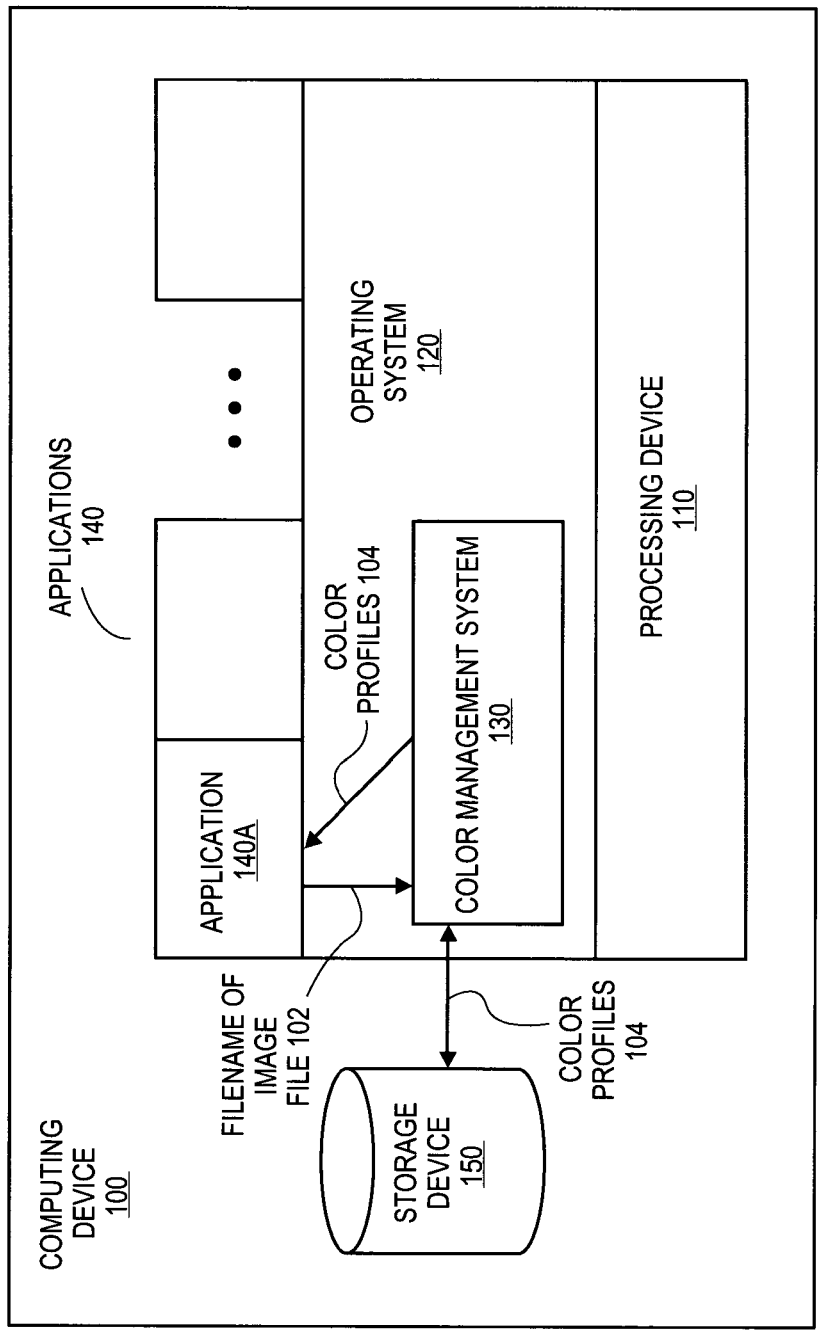
FIG. 1 illustrates one embodiment of a computing device usable in some embodiments of the invention.

FIG. 1 illustrates one embodiment of a computing device usable in some embodiments of the invention. The computing device 100 may be a personal desktop computer, a server, a laptop computer, a tablet computer, a personal digital assistant (PDA), a smart phone, a digital camera, a portable media viewing device (e.g., an electronic book viewer), a video game console, a printer, etc. The computing device 100 includes at least a processing device 110 and a storage device 150.

The processing device 110 represents one or more general-purpose processing devices such as a microprocessing device, a central processing unit, or the like. More particularly, the processing device 110 may be complex instruction set computing (CISC) microprocessing device, reduced instruction set computing (RISC) microprocessing device, very long instruction word (VLIW) microprocessing device, or processing device implementing other instruction sets, or processing devices implementing a combination of instruction sets. The processing device 110 may also be one or more special-purpose processing devices such as an application specific integrated circuit (ASIC), a field programmable gate array (FPGA), a digital signal processing device (DSP), network processing device, or the like. The processing device 110 is configured to execute a color management system 130 for performing the operations and steps discussed herein.

The storage device 150 includes one or more machine-readable storage media (a.k.a. computer-readable storage media) to store data and/or instructions. In some embodiments, the storage device 150 includes one or more of the following: read-only memory (ROM), flash memory, dynamic random access memory (DRAM) (such as synchronous DRAM (SDRAM)), a static memory (e.g., flash memory, static random access memory (SRAM), etc.

The computing device 100 may further include other hardware components not shown. For example, the computing device 100 may include a network interface device to communicably couple to a network (e.g., local area network (LAN), Ethernet, Internet, etc.). The computing device 100 also may include a video display unit (e.g., a liquid crystal display (LCD), a cathode ray tube (CRT), a touch screen, etc.), an input device (such as a touch screen, an alphanumeric input device (e.g., a keyboard), a cursor control device (e.g., a mouse, a joystick, etc.), etc.), and a signal generation device (e.g., a speaker).

In some embodiments, the processing device 110 is configured to execute an operating system 120, such as Linux, Windows®, Mac OS®, etc. In addition, one or more applications 140 (such as application 140A) run on the operating system 110. Some examples of the applications 140 include network access applications (e.g., electronic mail applications, browsers, etc.), digital photo processing and/or viewing applications, document processing applications, etc. The operating system 120 further includes a color management system 130. In general, the color management system 130 controls conversion between color representations of the computing device 100 and other devices (e.g., digital cameras, printers, smart phones, etc.). The color management system 130 may create and manage color profiles for the computing device 100. In general, a color profile defines how a device responds to one or more colors. One example of a color profile is an ICC profile.

In some embodiments, the color management system 130 is the first port of call for the applications 140 that request session and system color settings. For instance, the color management system 130 may provide an interface (e.g., a DBus interface) that the applications 140 can query. The color management system 130 may provide properties like colorspace-rgb for the default RGB color space for editing, and functions like GetProfileForWindow, which would return a color profile for the display region (e.g., a window) on the screen. The color management system 130 can also perform color correction for the applications 140.

In some embodiments, the color management system 130 provides a user interface, such as a color profile control panel. Via the user interface, a user of the computing device 100 may select an image file and input the image file into the color management system 130. Note that the image file may or may not be selected from a device physically connected to the computing device 100. In one example, the image file may be an image file stored on a digital camera physically connected to the computing device 100 (e.g., via a Universal Serial Bus (USB) cable, a dock, etc.). In another example, the image file may be downloaded from a remote source (e.g., a server) to the computing device 100 using a network access application (e.g., an electronic mail application, a browser, etc.).

In the image file, most of the data is the colors of each pixel, forming a huge two-dimensional (2D) grid. Modern image formats, such as Joint Photographic Experts Group format (JPEG), Tagged Image File Format (TIFF), and raw unprocessed data (a.k.a. RAW), allow encoding of other data into the image file, such as the time the image was acquired, what aperture the lens was set to when the image was captured, etc. There are many metadata standards, such as Exchange Image File Format (EXIF). Some EXIF tags are standardized, but most vendors also write their own EXIF tags into the image files without standardizing on common fields (e.g., Exif.OlympusEq.InternalSerialNumber). The way to extract and read the metadata is also very different between different file formats and many applications usually only support one type, if any at all.

The color management system 130 may examine the image file and determine the type of the image file (e.g., JPEG, bitmap, etc.). Based on the type of the image file, the color management system 130 may extract metadata from the image file until the color management system 130 has enough information to create a unique profile. In some embodiments, the metadata includes a maker of the device that captured the image or created the image file (e.g., a digital camera), a model identifier of the device, a serial number of the device, settings of the device when capturing the image or creating the image file (e.g., whether the flash went off or not, what aperture the lens was set to when the image was captured, etc.), and/or other information about the image file (e.g., time at which the image was captured). For example, if the metadata of an image file indicates that the digital camera that captured the image was a particular model made by a certain manufacturer, then a pre-defined color profile for the particular model of digital camera from the manufacturer may be incorporated into the color profile to be generated for this image file. In another example, if the metadata of an image file indicates that the flash went off when the image was captured, then the color profile to be generated may be set up to compensate for the brightness due to the flash.

Figure 2:
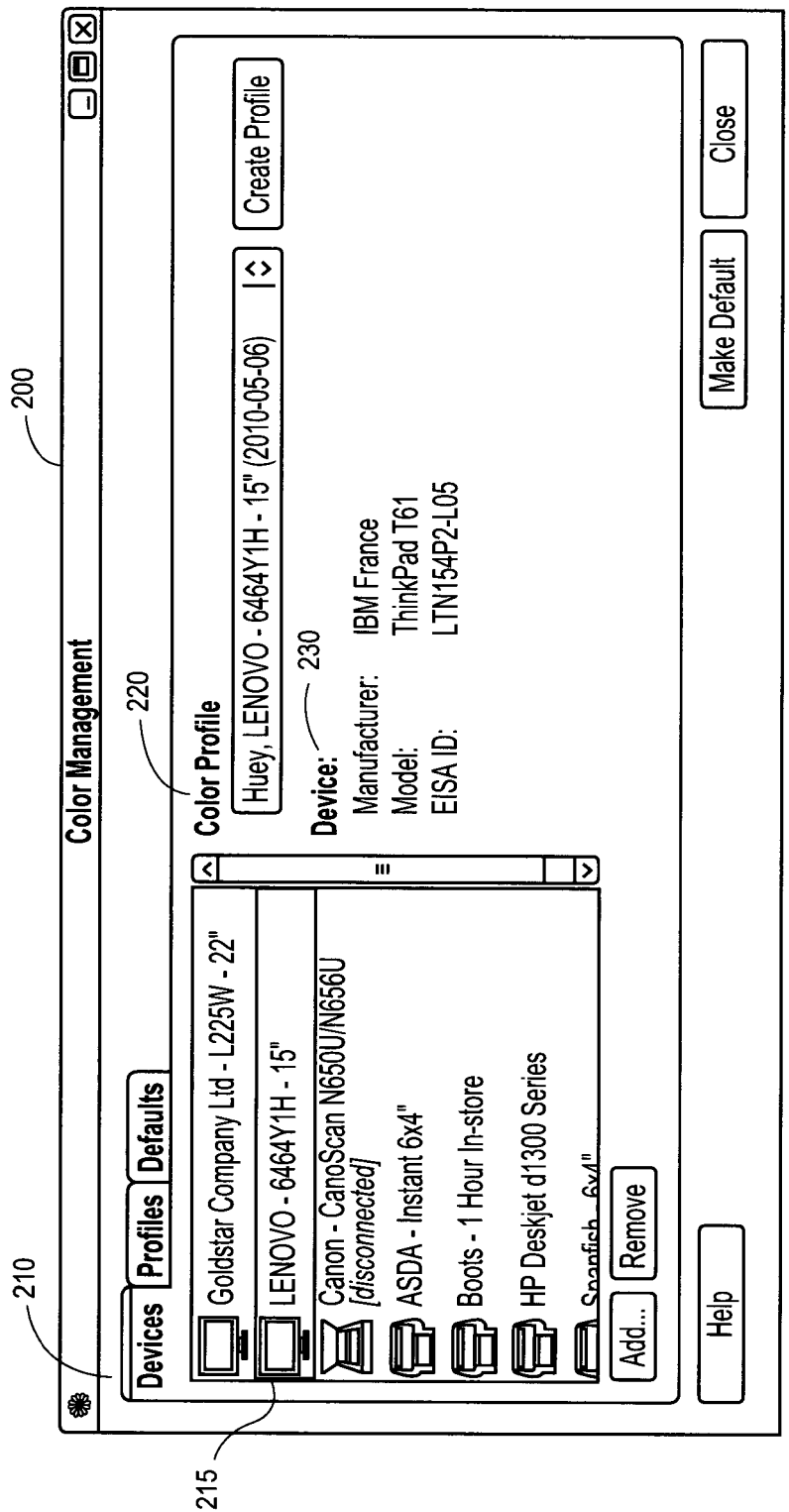
FIG. 2 shows an exemplary embodiment of a graphical user interface provided by one embodiment of a color management system.

In some embodiments, the color management system 130 creates a virtual device for the image file and then assigns the color profile created from the metadata of the image file to the virtual device. Using the concept of virtual devices, a user can then assign more than one color profile to a physical device. The color management system 130 may provide a graphical user interface (GUI) to display the color profiles created for various virtual devices. FIG. 2 illustrates one exemplary embodiment of a GUI provided by the color management system 130.

Referring to FIG. 2, the GUI 200 displays a list of virtual devices 210. A user may select one of the virtual devices 210 via the GUI 200, for example, by pointing a cursor at the virtual device desired 215 and clicking on it. In response, the GUI 200 may display the color profile 220 and physical device 230 associated with the virtual device 215 selected. Note that the various user interface controls and icons displayed in the GUI 200 may be arranged in different ways, and the appearance of them may be designed in different ways in other embodiments.

Referring back to FIG. 1, the color management system 130 may further provide guided prompts via the user interface to allow the user to calibrate the virtual device. The color profiles created can then be used by the applications 140 to control colors when processing (e.g., displaying, rendering, printing, etc.) image files. The color profiles created may be stored in the storage device 150 for future use.

By removing the burden of trying to create or find a suitable color profile from the applications 140, the applications 140 do not have to include multiple different libraries and tens of thousands of lines of code just to read the metadata of image files. The logic for reading and processing the metadata of image files can be consolidated or centralized in the color management system 130. The color management system 130 may provide a method, such as GetProfilesByFile( ) to allow the applications 140 to readily obtain one or more color profiles using a filename of an image file. For example, referring to FIG. 1, application 140A simply passes the filename of an image file 102 that it is trying to view, to the color management system 130. The color management system 130 may open the filename 102, get the metadata, and match the metadata against color profiles in the storage device 150. Then the color management system 130 returns the color profiles 104 found suitable for displaying the image file to the application 140A. The application 140A may receive back a list of color profiles 104 that can be used from the color management system 130. A user of the application 140A may select a color profile from the list of color profiles 104 returned. In some embodiments, the list of color profiles 104 returned may be arranged in the order of preference to make the selection process more user friendly. If the application 140A is simply configured to use the default color profile, then the user may not be notified of other possible color profiles found. Alternatively, the application 140A could also show the list of color profiles found 104 in a drop down user interface and ask the user to choose one if there are multiple color profiles returned. In some embodiments, the application 140A can send a "hint" indicator to the color management system 130 to influence the choice or ordering of color profiles. For example, the hint indicator could be "flash," "studio," etc.

In some embodiments, the color management system 130 further allows users to update or calibrate a color profile for a particular input device (e.g., a digital camera, a scanner, etc.). A user can update or calibrate the color profile of interest once, and then all the applications 140 can use the updated or calibrated profile. In other words, there is no need for each of the applications 140 to update or calibrate the color profile.

Figure 3:
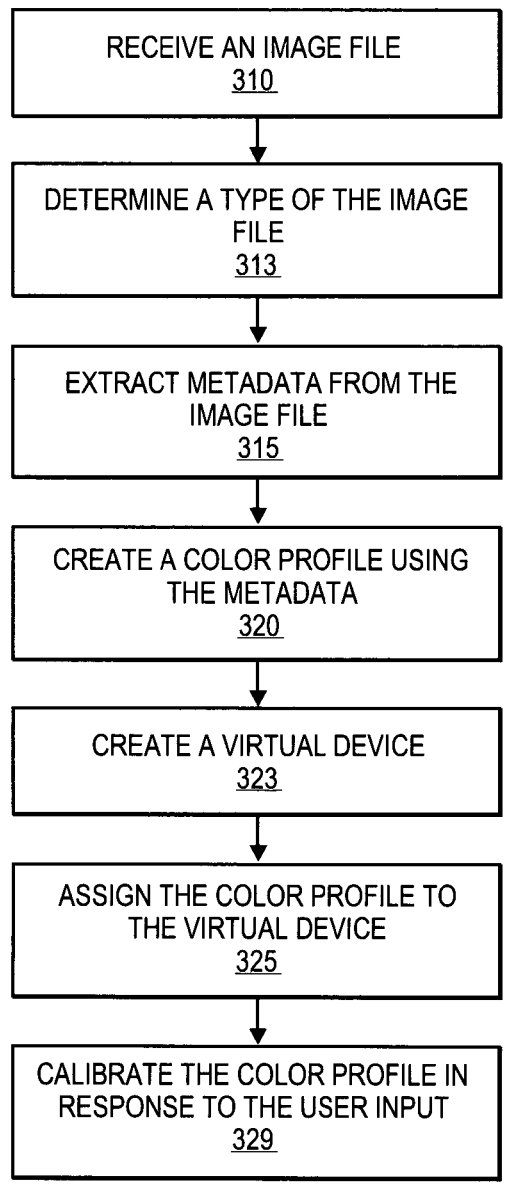
FIG. 3 shows a flowchart of one embodiment of a method to create a color profile from an image file.

FIG. 3 shows a flowchart of one embodiment of a method to create a color profile from an image file. The method may be performed by processing logic that may comprise hardware (e.g., circuitry, dedicated logic, programmable logic, microcode, etc.), software (such as instructions run on a processing device), firmware, or a combination thereof. For instance, the color management system 130 illustrated in FIG. 1 may perform at least part of the method in some embodiments.

In some embodiments, processing logic receives an image file (processing block 310). Then processing logic determines a type of the image file (processing block 313). For example, the type of the image file may be JPEG, bitmap, RAW, etc. Next, processing logic extracts metadata from the image file based on its type (processing block 315). The metadata may include a maker of the device that captured the image or created the image file (e.g., a digital camera), a model identifier of the device, a serial number of the device, settings of the device when capturing the image or creating the image file (e.g., whether the flash went off or not), and/or other information about the image file (e.g., time at which the image was captured).

Using the metadata extracted, processing logic may create a color profile (processing block 320). Then processing logic further creates a virtual device (processing block 323). Processing logic may assign the color profile created to the virtual device (processing block 325). Optionally, processing logic may calibrate the color profile in response to user input (processing block 329). For example, processing logic may create a GUI to ask users if calibration of the color profile created is desired, and if so, additional GUI (e.g., a calibration wizard) may be created to guide the users through the calibration process.

Figure 4:
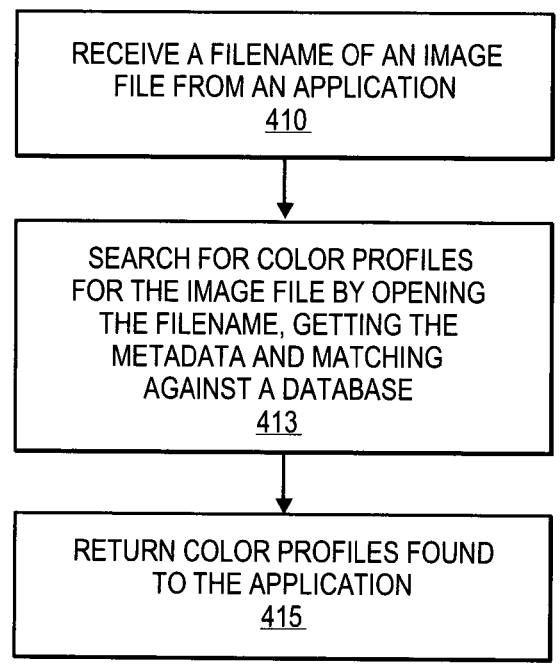
FIG. 4 illustrates a flowchart of one embodiment of a method to obtain a color profile for an image file.

FIG. 4 illustrates a flowchart of one embodiment of a method to obtain a color profile for an image file. The method may be performed by processing logic that may comprise hardware (e.g., circuitry, dedicated logic, programmable logic, microcode, etc.), software (such as instructions run on a processing device), firmware, or a combination thereof. For instance, the color management system 130 illustrated in FIG. 1 may perform at least part of the method in some embodiments.

Initially, processing logic receives a filename of an image file from an application, such as a photo viewing application (processing block 410). Multiple color profiles may have already be created according to the method discussed above with reference to FIG. 3. One or more of the color profiles may be suitable for displaying or processing the image file. Processing logic searches for color profiles for the image file by opening the filename, getting the metadata and matching against a database of color profiles (processing block 413). Then processing logic returns the color profiles found to the application (processing block 415). In some embodiments, the color profiles found may include a default color profile and the application may simply use the default color profile to display the image file. Alternatively, the application may output a list of the color profiles found to a user and allow the user to select a color profile out of the color profiles found. In some embodiments, processing logic or the application may prioritize the color profiles found so that the application can display the color profiles in the order of preference.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "extracting" or "creating" or "assigning" or "determining" or "calibrating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including optical disks, CD-ROMs, and magnetic-optical disks, read-only memories (ROMs), random access memories (RAMs), EPROMs, EEPROMs, flash memories, magnetic or optical cards, or any type of media suitable for storing electronic instructions, where each may be coupled to a computer system bus or an input/output port (e.g., USB input/output port).

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Thus, some embodiments of a system and a method to manage colors of image files in computing devices have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   extracting, by a processing device, metadata from a first image file in view of a type of the first image file, wherein the metadata is without an embedded color profile;
   creating a color profile in view of the extracted metadata comprising one or more settings of an input device that created the first image file;
   storing the created color profile in a storage device;
   creating a virtual device;
   adjusting the color profile in view of a setting associated with the first image file;
   calibrating the adjusted color profile; and
   assigning, by the processing device, the calibrated color profile to the virtual device.

2. The method of claim 1, further comprising:
   receiving the first image file from an application running on the processing device; and
   determining the type of the first image file.

3. The method of claim 1, further comprising:
   calibrating the color profile created in response to user instructions.

4. The method of claim 1, wherein an input device, which has created the first image file, is not physically connected to the processing device.

5. The method of claim 1, wherein the metadata comprises at least one of a maker of the input device that has created the first image file, a model identifier of the input device, or a serial number of the input device.

6. The method of claim 1, further comprising:
   receiving a filename of a second image file from a second application;
   searching in a database for color profiles usable to display the second image file; and
   returning color profiles found to the second application, wherein a user of the second application is allowed to select one of the color profiles found.

7. The method of claim 1, further comprising:
   receiving a filename of a second image file from a second application;
   retrieving a default color profile usable to display the second image file; and
   returning the default color profile to the second application.

8. The method of claim 1, further comprising:
   creating a second color profile in view of metadata of a second image file;
   creating a second virtual device; and
   assigning the second color profile to the second virtual device, wherein the second image file and the first image file have been created by a same physical device.

9. An apparatus comprising:
   a storage device; and
   a processing device communicatively coupled to the storage device, to:
      extract metadata from a first image file in view of a type of the first image file, wherein the metadata is without an embedded color profile,
      create a color profile in view of the extracted metadata comprising one or more settings of an input device that created the first image file;
      store the created color profile in the storage device;
      create a virtual device;
      assign the color profile to the virtual device;
      adjust the color profile in view of a setting associated with the first image file;
      calibrate the adjusted color profile; and
      assign the calibrated color profile to the virtual device.

10. The apparatus of claim 9, wherein the processing device is configured to execute an application, and receive the first image file from the application, and determine the type of the first image file.

11. The apparatus of claim 9, the processing device to calibrate the color profile created in response to user instructions.

12. The apparatus of claim 9, wherein an input device, which has created the first image file, is not physically connected to the processing device.

13. The apparatus of claim 9, wherein the metadata comprises at least one of a maker of the input device that has created the first image file, a model identifier of the input device, or a serial number of the input device.

14. The apparatus of claim 9, the processing device to:
   receive a filename of a second image file from a second application,
   search in the storage device for color profiles usable to display the second image file, and
   return color profiles found to the second application, wherein a user of the second application is allowed to select one of the color profiles found.

15. The apparatus of claim 9, the processing device to receive a filename of a second image file from a second application, to:
   retrieve a default color profile usable to display the second image file, and
   return the default color profile to the second application.

16. The apparatus of claim 9, the processing device to:
   create a second color profile in view of metadata of a second image file and a second virtual device, and
   assign the second color profile to the second virtual device, wherein the second image file and the first image file have been created by a same physical device.

17. A non-transitory computer-readable storage medium embodying instructions that, when executed by a processing device, cause the processing device to:
   extract metadata from a first image file in view of a type of the first image file, wherein the metadata is without an embedded color profile;
   create a color profile in view of the extracted metadata comprising settings of an input device that created the first image file;
   store the created color profile in the storage device;
   create a virtual device;
   adjust the color profile in view of a setting associated with the first image file;
   calibrate the adjusted color profile; and
   assign, by the processing device, the calibrated color profile to the virtual device.

18. The non-transitory computer-readable storage medium of claim 17, wherein the processing device further to:
   receive the first image file from an application running on the processing device; and
   determine the type of the first image file.

19. The non-transitory computer-readable storage medium of claim 17, wherein the processing device is further to:
   calibrate the color profile created in response to user instructions.

20. The non-transitory computer-readable storage medium of claim 17, wherein an input device, which has created the first image file, is not physically connected to the processing device.

21. The non-transitory computer-readable storage medium of claim 17, wherein the metadata comprises at least one of a maker of the input device that has created the first image file, or a model identifier of the input device, a serial number of the input device.

22. The non-transitory computer-readable storage medium of claim 17, wherein the processing device is further to:
- receive a filename of a second image file from a second application;
- search in a database for color profiles usable to display the second image file; and
- return color profiles found to the second application, wherein a user of the second application is allowed to select one of the color profiles found.

23. The non-transitory computer-readable storage medium of claim 17, wherein the processing device is further to:
- receive a filename of a second image file from a second application;
- retrieve a default color profile usable to display the second image file; and
- return the default color profile to the second application.

24. The non-transitory computer-readable storage medium of claim 17, wherein the processing device is further to:
- create a second color profile in view of metadata of a second image file;
- create a second virtual device; and
- assign the second color profile to the second virtual device, wherein the second image file and the first image file have been created by a same physical device.

* * * * *